(12) United States Patent
Cooper (10) Patent No.: US 9,648,482 B2
(45) Date of Patent: May 9, 2017

(54) LOCATION BASED, RADIO-DEVICE IDENTIFICATION APPARATUS AND METHOD

(71) Applicant: J. Carl Cooper, Los Gatos, CA (US)

(72) Inventor: J. Carl Cooper, Los Gatos, CA (US)

( * ) Notice: Subject to any disclaimer, the term of this patent is extended or adjusted under 35 U.S.C. 154(b) by 542 days.

(21) Appl. No.: 13/890,077

(22) Filed: May 8, 2013

(65) Prior Publication Data

US 2014/0335797 A1    Nov. 13, 2014

(51) Int. Cl.
| | |
|---|---|
| *H04W 8/00* | (2009.01) |
| *H04B 1/08* | (2006.01) |
| *H04H 60/25* | (2008.01) |
| *H04H 60/43* | (2008.01) |

(52) U.S. Cl.
CPC ........... *H04W 8/005* (2013.01); *H04B 1/082* (2013.01); *H04H 60/25* (2013.01); *H04H 60/43* (2013.01)

(58) Field of Classification Search
CPC ........ H04L 67/18; H04H 60/51; H04H 20/62; H04H 60/44; H04H 40/00; H04H 60/49; H04H 60/70
See application file for complete search history.

(56) References Cited

U.S. PATENT DOCUMENTS

| | | | | |
|---|---|---|---|---|
| 6,664,945 | B1* | 12/2003 | Gyde | G01C 23/00 340/945 |
| 6,865,379 | B1* | 3/2005 | Liebenow | 455/161.3 |
| 7,996,018 | B1* | 8/2011 | Fan | 455/456.3 |
| 8,194,573 | B1* | 6/2012 | Smith | H04W 8/005 370/255 |
| 2002/0009994 | A1* | 1/2002 | Sample | G01C 23/00 455/431 |
| 2002/0183059 | A1* | 12/2002 | Noreen et al. | 455/427 |
| 2003/0040272 | A1* | 2/2003 | Lelievre | H04H 20/26 455/3.06 |
| 2003/0165114 | A1* | 9/2003 | Kusama et al. | 370/216 |
| 2004/0166862 | A1* | 8/2004 | Voyer | 455/446 |
| 2004/0177085 | A1* | 9/2004 | Rappaport et al. | 707/101 |
| 2007/0142945 | A1* | 6/2007 | Beckmann et al. | 700/94 |
| 2007/0260364 | A1* | 11/2007 | Dwyer | G01C 23/00 701/3 |
| 2008/0057891 | A1* | 3/2008 | Klunk | 455/186.1 |
| 2010/0076576 | A1* | 3/2010 | Lee et al. | 700/94 |
| 2010/0151809 | A1* | 6/2010 | Jaisimha et al. | 455/303 |

* cited by examiner

*Primary Examiner* — Devan Sandiford
(74) *Attorney, Agent, or Firm* — J. Carl Cooper (57) ABSTRACT

An apparatus and method is disclosed to receive location data identifying the current location of a vehicle. A database, storing radio device records, is then queried. Each radio device record in the database identifies a radio device (e.g., a transmitter, receiver, transceiver, transponders, etc.) and a location of the radio device using a suitable coordinate system. Radio device records associated with radio devices likely to be within communication range of the vehicle may then be retrieved from the database. These radio device records may be used to generate a radio device list that may be presented to an occupant of the vehicle.

34 Claims, 6 Drawing Sheets

LOCATION BASED, RADIO-DEVICE IDENTIFICATION APPARATUS AND METHOD

BACKGROUND

This invention relates to radio frequency communications and more particularly to apparatus and methods for identifying and communicating with radio frequency devices based on location.

Safe aircraft operation depends in large part on the ability to successfully communicate with different radio devices on or above the earth's surface. In general, radio devices may include devices such as transmitters, receivers, transceivers, transponders, or the like that may be used for navigation, communication, or other purposes. A radio device may be designed to transmit and receive signals over one or more selected communication frequencies. As such, transmitters and receivers must normally be located within a certain distance of one another to communicate effectively. This distance may depend on the transmitting frequency, transmitting power, antenna type and orientation, receiving sensitivity, and relative elevations of transmitter and receiver, among other factors.

For example, VHF Omni-directional Range (VOR) is one type of radio navigation system used by aircraft. An aircraft operating at a given altitude may be able to detect a signal from a VOR transmitter, also located at some altitude, within some radius of the VOR transmitter. This radius may increase as the aircraft's altitude above the VOR transmitter increases. For example, an aircraft radio operating at 5000 feet above a VOR transmitter may be able to detect the VOR signal within a radius of about 30 miles. If the altitude of the aircraft radio is increased to 10,000 feet, this radius may increase to about 50 miles.

Similarly, communication equipment such as air traffic control, approach control, tower and ground voice communication equipment may be operable some distance from an airport facility and may depend on an aircraft's elevation relative to the facility. The range may be affected by mountains or other obstructions, which may interfere with higher frequency communications, and by factors such as transmitter power, which may vary depending on the time of time of the day (e.g., the transmitting power may be reduced at night).

Often, a pilot or radio operator will attempt to communicate with a radio device but will be unsuccessful because the device is out of range. This may cause the pilot to spend valuable time assessing the situation. For example, the pilot may spend time verifying that the correct radio frequency is selected on the aircraft radio, checking the aircraft position (including altitude) relative to the radio device, or checking for obstacles such as mountains that may be interfering with communication. In some cases, a pilot may attempt to communicate over an incorrect frequency. This may consume valuable pilot time and interfere with other pilots trying to utilize the same frequency. This may also create safety risks or cause substantial embarrassment to the pilot. It is not uncommon to hear attempts to communicate over incorrect frequencies, especially in areas of uncontrolled airports.

Currently, various navigation computers allow an operator to program a flight plan or flight route into the navigation computer. These navigation computers are typically coupled to a GPS receiver or other position-locating device. If the pilot desires, the navigation computer may be programmed to automatically select navigation aids as waypoints are passed while flying. For example, the navigation computer may be programmed to switch from a GPS receiver to an Instrument Landing System (ILS) receiver when an aircraft reaches an ILS path. This operation, however, typically requires the pilot to program the flight route into the navigation computer.

Current GPS receivers may also be configured to display the current location of an aircraft or other vehicle moving across a map. In aviation applications, these maps may be configured to display navigation or voice communication frequencies associated with various waypoints that are programmed into the GPS as part of a flight route. For example, a GPS receiver may be configured to display communication frequencies associated with a destination airport when the airport appears on the map or when the aircraft approaches the airport. Like the navigation computers previously described, these functions typically require that the pilot program the GPS receiver.

GPS receivers utilized with aviation applications often have a nearest airport function where a pilot can quickly locate the nearest airport, along with that airport's important radio frequencies. This information is typically stored in a database in the GPS. This function is quite useful in emergencies or in situations where the aircraft's passengers need a bathroom break. Unfortunately, while the airport radio frequencies are made available to the pilot, communications with the airport may not be possible because of distance, obstructions, and/or altitudes of the aircraft and airport.

Automobile radios often include favorite station memories which may be programmed by an operator such that a particular favorite station may be selected by simply pushing a button. These radios often include several sets of such memories, allowing an operation to select a set and thereby select the stations associated with that set. Drivers who commute to different cities often program these sets to include favorite stations associated with each city.

In view of the foregoing, what is needed is an apparatus and method to automatically present a list of radio devices within range, or substantially within range, of a vehicle, without requiring substantial programming by an operator. Ideally, such an apparatus and method would save time and reduce the chance that an operator would attempt to communicate over an incorrect frequency. Further needed are apparatus and methods to effectively present a list of such radio devices to an operator. As will be seen, the invention provides such solutions in an elegant manner.

BRIEF DESCRIPTION OF THE DRAWINGS

In order that the advantages of the invention will be readily understood, a more particular description of the invention briefly described above will be rendered by reference to specific examples illustrated in the appended drawings. Understanding that these drawings depict only typical examples of the invention and are not therefore to be considered limiting of its scope, the invention will be described and explained with additional specificity and detail through the use of the accompanying drawings, in which.

DETAILED DESCRIPTION

The invention has been developed in response to the present state of the art, and in particular, in response to the problems and needs in the art that have not yet been fully solved by currently available apparatus and methods. Accordingly, the invention has been developed to provide a novel apparatus and method for presenting a list of radio devices to an occupant of a vehicle. The features and advantages of the invention will become more fully apparent from the following description and appended claims and their equivalents, and also any subsequent claims or amendments presented, or may be learned by practice of the invention as set forth hereinafter.

Consistent with the foregoing, a method is disclosed in a first aspect of the invention as including receiving location data identifying the current location of a vehicle. A database, storing radio device records, is then queried. Each radio device record in the database identifies a radio device (e.g., a transmitter, receiver, transceiver, transponders, etc.) and a location of the radio device using a suitable coordinate system. Radio device records associated with radio devices likely to be within communication range of the vehicle may then be retrieved from the database. These radio device records may be used to generate a radio device list that may be presented to an occupant of the vehicle.

In selected examples, the database is further configured to store obstruction records. Each obstruction record may identify an obstruction, such as a mountain, plateau, tower, building, or the like, that may adversely affect communication between the vehicle and a radio device. The obstruction records, like the radio device records, may be retrieved from the database. In selected examples, the radio device list may identify radio devices that may be affected by one or more obstructions. In other examples, the radio device list may omit radio devices affected by one or more obstructions.

In certain examples, communication frequencies associated with the radio device records retrieved from the database may be scanned. In certain examples, the radio device list may exclude radio devices that are not detected during scanning. In other examples, the radio device list may identify which radio devices are detected (or not detected) during scanning. In yet other embodiments, radio device records in the database may be updated or supplemented in response to the scanning results and vehicle position, thereby allowing available radio devices at a given location to be "remembered."

In another example of the invention, an apparatus in accordance with the invention includes a location device to identify the current location of a vehicle, and a database to store radio device records. Each radio device record identifies a radio device and a location of the radio device. A control module is configured to receive the current location from the location device and retrieve, from the database, records of radio devices likely to be within communication range of the vehicle. A list generation module may then generate a radio device list from the radio device records retrieved from the database. A presentation device may present the radio device list to an occupant of the vehicle.

In yet another example of the invention, a method in accordance with the invention includes receiving location data identifying the current location of a vehicle. A database storing radio device records is then queried. Each radio device record identifies a radio device, a location of the radio device, and a communication frequency associated with the radio device. Radio device records associated with radio devices likely to be within communication range of the vehicle may then be retrieved from the database. The communication frequencies of these radio devices may then be scanned. Once scanned, a radio device list may be generated listing those radio devices that were detected during scanning. This radio device list may then be presented to an occupant of the vehicle.

In still another example of the invention, an apparatus in accordance with the invention includes a location device to identify the current location of a vehicle, and a database to store radio device records. Each radio device record identifies a radio device, a location of the radio device, and a communication frequency associated with the radio device. A control module is configured to receive the current location from the location device and retrieve, from the database, records of radio devices likely to be within communication range of the vehicle. A scanner (used herein to mean radio device detection) then scans the communication frequencies of these radio devices. A list generation module generates a radio device list of radio devices detected by the scanner. A presentation device may then present the radio device list to an occupant of the vehicle.

It will be readily understood that the components of the invention, as generally described and illustrated in the Figures herein, may be arranged and designed in a wide variety of different configurations. Thus, the following more detailed description of the examples of the system, apparatus and methods of the invention, as represented in the Figures, is not intended to limit the scope of the invention, as claimed, but is merely representative of selected examples of systems, devices and methods that embody or otherwise incorporate the invention.

Some of the functional units described in this specification have been labeled as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose of the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one example," "an example," or similar language means that a particular feature, structure, or characteristic described in connection with the example may be included in at least one example of the invention. Thus, appearances of the phrases "in one example" or "in an example" in various places throughout this specification are not necessarily all referring to the same example.

Furthermore, the described features, structures, or characteristics may be combined in any suitable manner in one or more examples. In the following description, specific details may be provided, such as examples of programming, software modules, user selections, or the like, to provide a thorough understanding of examples of the invention. One skilled in the relevant art will recognize, however, that the invention can be practiced without one or more of the specific details, or with other methods or components. In other instances, well-known structures, or operations are not shown or described in detail to avoid obscuring aspects of the invention.

The illustrated examples of the invention will be best understood by reference to the drawings, wherein like parts are designated by like numerals throughout. The following description is intended only by way of example, and simply illustrates certain selected examples of apparatus and methods that are consistent with the invention as claimed herein.

Figure 1:
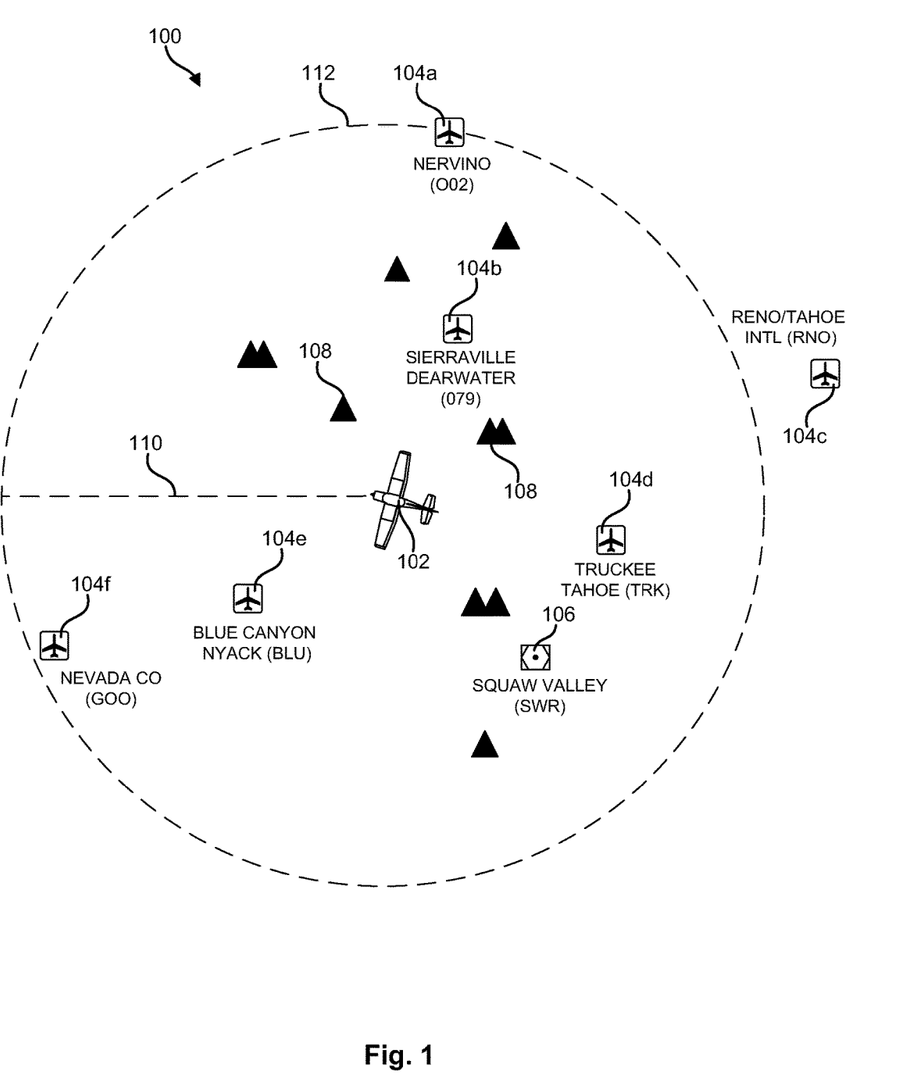
FIG. 1 is a high-level map showing an aircraft and several airports having radio devices associated therewith.

Referring to FIG. 1, a simple map 100 is shown to provide a basic understanding of the invention. As shown, the map 100 includes an aircraft 102, several airports 104a-f, and a ground station 106, in this example a VOR ground station 106. Each airport 104a-f or ground station 106 may have associated therewith one or more radio devices, such as transmitters, receivers, transceivers, transponders, or the like. These radio devices, for example, may include devices for broadcasting weather information, providing voice communication channels, broadcasting safety information, broadcasting location information, broadcasting information regarding possible hazards along a flight path, or the like. More generally, a radio device, as used herein, may include any type of device configured to transmit or receive electromagnetic energy, as opposed to just audio communications types of radios. The map 100 also shows various obstructions 108. In this example, the obstructions 108 are mountains 108 but may also include obstructions such as buildings, plateaus, towers, power lines, or other objects that may affect communication between an aircraft 102 and radio devices.

In general, the aircraft 102 may be simplistically characterized as having a communication range having a radius 110. Radio devices falling within this communication range may reside within a circle 112 defined by the radius 110. In certain examples, the range 110 may be calculated based on the altitude of the aircraft 102 as well as other criteria. For example, an aircraft 102 flying at low altitudes may be determined to have a range 110 on the order of tens of miles whereas an aircraft flying at high altitudes may have a range 110 on the order of hundreds of miles.

The determined range 110 does not need to be highly accurate for all radio devices falling within the radius 110, but may represent an approximation or an average value. Thus, the aircraft 102 may actually be able to communicate with some devices outside the radius 110 and not be able to communicate with some devices inside the radius 110. Accordingly, the range 110 may be calculated using averages, groupings, approximations, or the like, which may or may not be highly accurate for all radio devices falling inside or outside the radius 110. In other embodiments, the communication range may be determined separately for each device.

Figure 2:
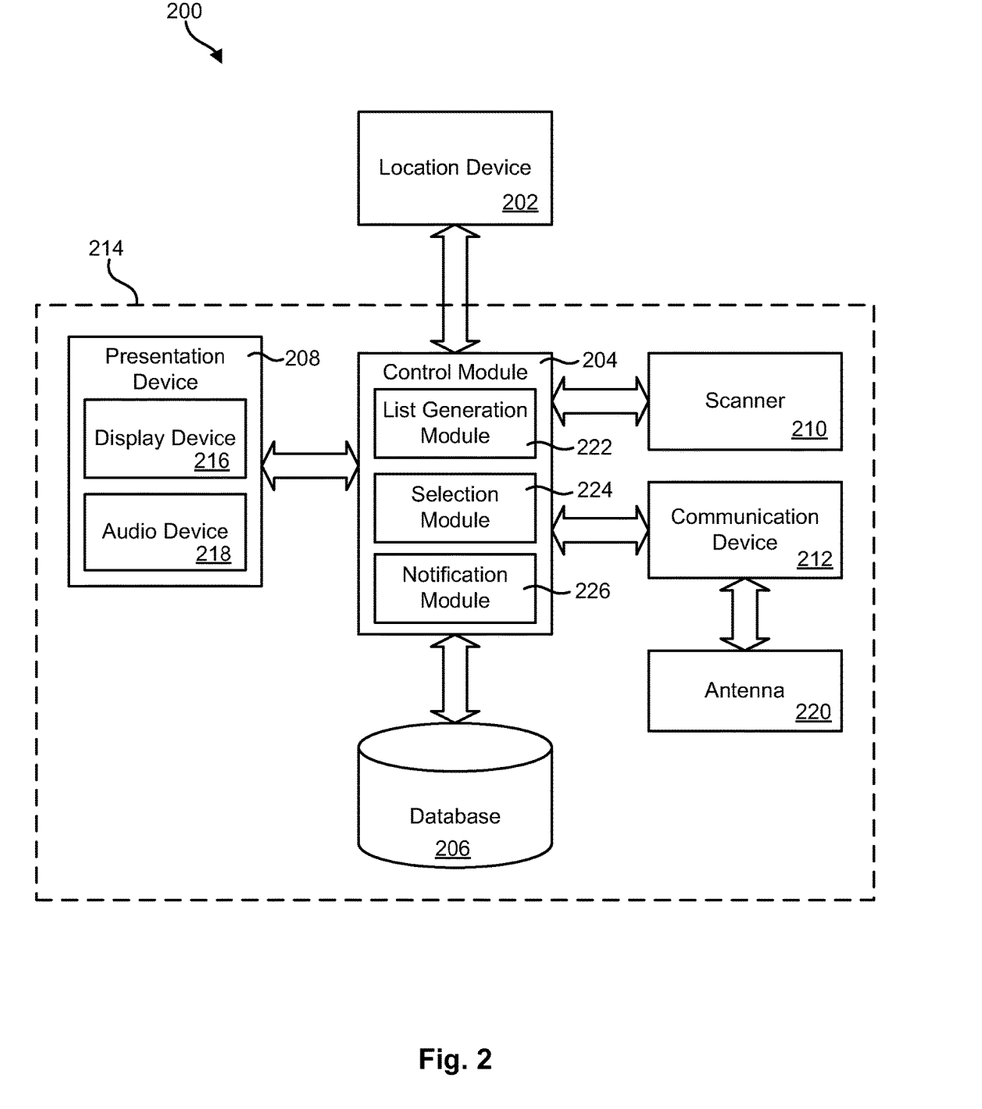
FIG. 2 is a high-level block diagram of one example of an apparatus in accordance with the invention.

Referring to FIG. 2, in selected examples, an apparatus 200 in accordance with the invention may include various components. The apparatus 200 may include all of the illustrated components, or fewer or additional components as needed. In certain examples, an apparatus 200 in accordance with the invention may include a location device 202, a control module 204, a database 206, and a presentation device 208. The apparatus 200 may also, in certain examples, include a scanner 210 and a communication device 212.

The components described in FIG. 2 may be grouped together in any suitable manner to provide the function and stated purpose of the invention. For example, each of the components 204, 206, 208, 210, 212 may be included in a radio transceiver 214 whereas the location device 202 may be embodied as a separate device. In other examples, the components may be combined or grouped together such that they are integrated or distributed across different pieces of equipment. All combinations or groupings which achieve the stated purpose and functionally of the invention are intended to be within the scope of the invention. Accordingly, in selected examples, several components may be combined into a single component or individual components may be broken down into several components. In other examples, the functionality of the components may be isolated or overlap with other components. Each of the components may be implemented in hardware, software, firmware, or combinations thereof.

In certain examples, a location device 202 may be used to detect the current location of a vehicle and may include, for example, a GPS receiver, or a LORAN, VOR, ADF, VORTAC, RADAR, or ILS navigation system. The location device 202 may also, in certain examples, include inertial (including MEMS and laser gyroscope) based position-determining devices, or use technologies such as Decca, Omega, celestial observation, compasses, or the like.

A control module 204 may receive the current location information from the location device 202 and retrieve, from a database 206, records associated with radio devices that are within the communication range of the vehicle. In certain examples, the control module 204 may also retrieve records associated with one or more obstructions, such as mountains, buildings, or the like, that may affect communication between the vehicle 102 and radio devices. Using the radio device and obstruction information retrieved from the database 206, a list generation module 222 may then generate a list of radio devices that are likely to be within the communication range of the vehicle 102. In selected examples, this radio device list may be output to a presentation device 208 such as a display device 216 or audio device 218 for presentation to an occupant of the vehicle 102.

In certain examples, the apparatus 200 may also include a scanner 210 to scan the communication frequencies of radio devices in the radio device list. Radio devices that are not detected by the scanner 210 may then be deleted from or identified in the radio device list to show that communication with these radio devices is unlikely to be successful.

Thus, the scanner 210 may be used to verify that radio devices in the list are actually within communication range of the vehicle 102 and are not inoperative or blocked by an obstruction. Thus, the scanner 210 may be used to weed out radio devices that are within the radius 110 but are nevertheless unable to communicate with the vehicle 102.

In certain examples, the control module 204 may also interface with a communication device 212. This may allow an operator (e.g., human, machine, etc.) to select, and thereby communicate with, a radio device in the radio device list. For example, if the radio device list identifies a voice communication channel that is within the communication range of the vehicle 102, a selection module 224 may allow the operator to select the radio device from the list and thereby establish communication with the radio device over the appropriate communication frequency. The communication device 212 may communicate with the radio device by way of an antenna 220.

In selected examples, a notification module 226 may be provided to notify an operator, through an audio or visual indicator, that the occupant is attempting to communicate with a radio device that is out of the communication range of the vehicle 102, not detected by the scanner 210, or affected by an obstruction.

In other examples, the control module 204 may preclude a user from selecting radio devices that are not in the list, or at least notify the operator that he or she is attempting to communicate with a radio device that is not in the list because it is out of range, affected by obstructions, or is not accessible due to the altitude of the aircraft 102. Such a feature may save valuable pilot time and reduce operator errors caused by transposing numbers, misunderstanding frequency assignments, misreading charts, or the like. This feature may also reduce the chance that a pilot will unintentionally attempt to communicate over legitimate frequencies that may be reserved for emergency or distress signals. This feature may also be used to ensure that selected communication frequencies are only utilized in certain areas. For example, in closely located municipalities, this feature may be used to ensure that an emergency vehicle is communicating with the municipality it is located in or traveling toward.

In yet other examples, the notification module 226 may be configured to notify a pilot that selecting a radio device is inappropriate in view of the aircraft's position. Such situations may occur if a pilot attempts to select ground control while in the air, select departure control while approaching or on the ground, select approach control while departing or on the ground, or select a particular sector approach or departure control from the wrong sector. In some cases, the appropriateness of the radio device may depend on whether the aircraft is airborne or not, which may be determined by checking the aircraft's altitude and location against a database of terrain elevations. Similarly, the appropriateness of a sector frequency may be determined by including sector information in the database 206 along with approach and departure frequencies.

Figure 3:
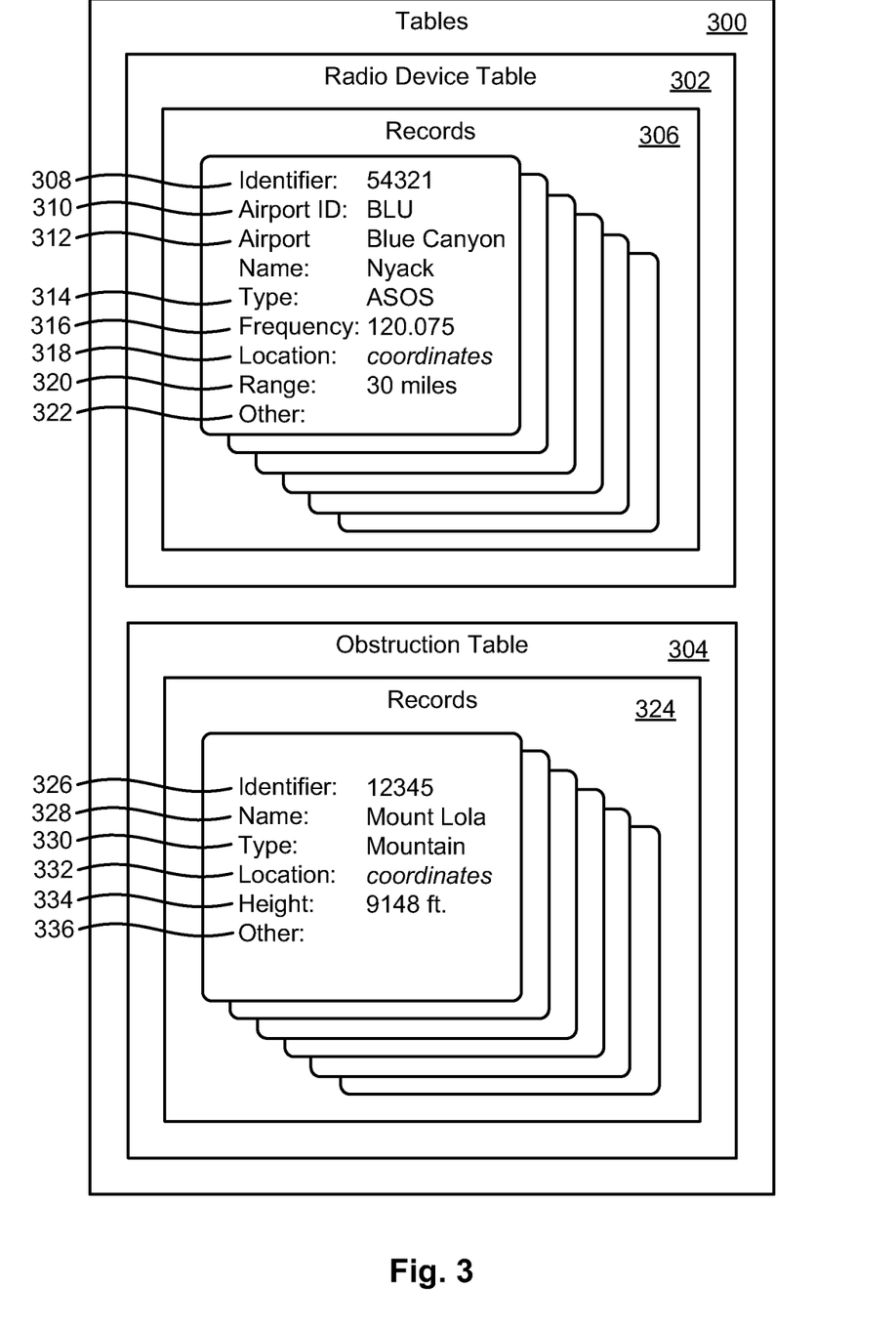
FIG. 3 is a high-level block diagram showing one contemplated example of records that may be stored in a database in accordance with the invention.

Referring to FIG. 3, as mentioned, the control module 204 may retrieve radio device and obstruction records from a database 206. In certain examples, the database 206 may store data in one or more tables 300, although other methods for storing and structuring radio device and obstruction data may be used and is within the scope of the invention. In certain examples, records in the database 206 may be automatically or manually updated as necessary, such as the way GPS-based flight displays are presently updated by scanning available radio devices at particular locations or otherwise. As shown, the tables 300 may, in certain examples, include a radio device table 302 and an obstruction table 304.

The radio device table 302 may store radio device records 306 associated with radio devices. In selected examples, these records 306 may store various data fields to provide information about a radio device. For example, the data fields may include an identifier 308 uniquely identifying a radio device, an airport identifier 310 identifying an airport or ground station associated with a radio device, an airport name 312, a type 314 associated with the radio device, a communication frequency 316 used by the radio device, a location 318 (e.g., GPS coordinates) of the radio device, and a range 320 associated with the radio device, as well as other desired information 322. The records 306 may contain all of the fields, or may contain more or fewer fields than those listed.

In selected examples, instead of providing the range 320 as a fixed value, the range 320 may be calculated from other fields or criteria. For, example the range may be calculated by taking into account the radio device's transmitting power, communication frequency, variations in the radio device's transmitting power as a function of the time of day or day of week, the antenna type and orientation, relative elevations of transmitter and receiver, weather conditions, or the presence of sun spots. Some of this information may be stored in fields of the records 306 and may allow the range to be calculated dynamically instead of being provided as a fixed value 320.

Similarly, an obstruction table 304 may store obstruction records 324 associated with obstructions that can potentially affect communication between a vehicle 102 and a radio device. Such obstructions may include, for example, mountains, plateaus, towers, buildings, power lines, or the like. In selected examples, the obstruction records 324 may store data fields such as an identifier 326 uniquely identifying an obstruction, a name 328 associated with the obstruction, a type 330 associated with the obstruction, a location 332 of the obstruction, and a height 334 or other dimensions associated with the obstruction, as well as other information 336. As with the radio device records 306, the obstruction records 324 may contain more or fewer fields than those listed. In certain embodiments, obstructions may also be recognized by scanning where an intermittent loss of contact vs. location of the aircraft is observed. In such instances, the computed location of the obstruction and/or the location of the aircraft when contact was lost may be stored in the database 206.

Figure 4:
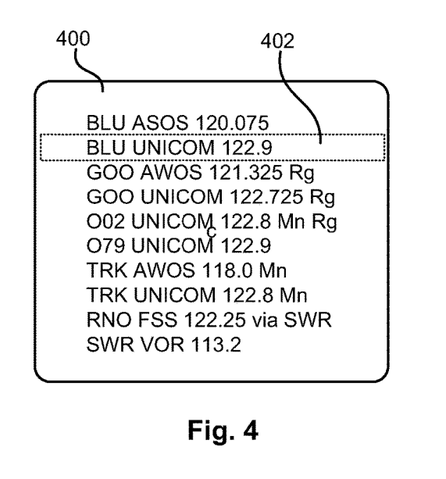
FIG. 4 illustrates one example of a display for presenting a list of radio devices to an occupant of a vehicle.

Referring to FIG. 4, while continuing to refer generally to FIG. 1, in selected examples, a list of radio devices within the communication range of a vehicle 102 may be presented to an operator on a display device 216, such as an LCD, plasma, or CRT display. The list may be presented alphanumerically by itself or may be superimposed over a flight-related display such as a moving map. Furthermore, the display device 216 may be integrated into a radio, navigation computer, or other device, as needed, or may be a stand-alone device.

When the aircraft 102 illustrated in FIG. 1 comes within communication range of certain airports 104*a-f*, ground stations 106, or the like, the control module 204 may retrieve the appropriate radio device records 306 from the database 206 and present a list to the pilot. For example, a list similar to that illustrated in FIG. 4 may be displayed on the pilot's radio or navigation computer.

In this example, BLU, GOO, O02, O79, TRK and RNO are codes or identifiers associated with the Blue Canyon Nyack, Nevada County, Nervino, Sierraville Dearwater, Truckee, and Reno airports, respectively. ASOS and AWOS identify automated weather broadcasts located at the airports that are listed. UNICOM identifies voice communication channels at the airports that are listed. FSS identifies a flight service station, a manned Federal Aviation Administration service to aid pilots in safe flying and navigation. These stations often receive communication signals on one frequency and transmit on another. VOR identifies a VHF Omnidirectional Radio Range navigation aid and SWR identifies the Squaw Valley VOR. The numeric entries (e.g., 120.075) identify communication frequencies for each of the respective radio devices in MHz. In this example, a "Mn" following the communication frequency indicates possible obstruction by mountains. A "Rg" following the communication frequency indicates that a radio device is at or near the outer limit of the aircraft's communication range.

Thus the entries on the display 400 would have the following meanings to the pilot:

| | |
|---|---|
| BLU ASOS 120.075 | Blue Canyon Nyack airport automated weather report at 120.075 MHz |
| BLU UNICOM 122.9 | Blue Canyon Nyack airport voice communication at 122.9 MHz |
| GOO AWOS 121.325 Rg | Nevada County airport automated weather report at 121.325 MHz and near the limit of the range |
| GOO UNICOM 122.725 Rg | Nevada County airport voice communication at 122.725 MHz and near the limit of the range |
| O02 UNICOM 122.8 Mn Rg | Nervino airport voice communication at 122.8 MHz, near the limit of the range and may be obstructed by mountains |
| O79 UNICOM 122.9 | Sierraville airport voice communication at 122.9 MHz |
| TRK AWOS 118.0 Mn | Truckee airport voice communication at 118.0 MHz and may be obstructed by mountains |
| TRK UNICOM 122.8 Mn | Truckee airport voice communications at 122.8 MHz and may be obstructed by mountains |
| RNO FSS 122.25 via SWR | Reno flight service station receives at frequency 122.25 MHz and transmits over the Squaw Valley VHF Omnidirectional Radio Range navigation aid |
| SWR VOR 113.2 | Squaw Valley VHF Omnidirectional Radio Range navigation aid transmits at 113.2 MHz |

It should be recognized that the format and type of information provided in FIG. 4 is presented only by way of example and is not intended to be limiting. Indeed, different types of information may be provided and the information may be arranged, grouped, or formatted in a variety of different ways. For example, the radio device frequency, although represented in MHz in this example, could also be represented by a channel number, mnemonic, or other identifier. In selected examples, the information may be completely spelled out, abbreviated, or coded. In certain examples, the type and/or format of the information may be selected to fit a particular application or the preference of an operator.

In certain examples, the apparatus 200 may allow a user to select, and thereby communicate with, one or more radio devices in the list. Upon selecting a radio device, the radio device may appear as a highlighted region 402 on the display 400, or be identified by a cursor, arrow, different color text, or the like. Similarly, the operator may select a radio device from the list using a knob, buttons, scrolling device, touch screen, or the like, the likes of which are well known in the art.

In other examples, the radio devices may be presented in the order they will likely be selected. This order may be based on an aircraft's position, direction, speed, altitude, or the like, and may facilitate selection of the frequencies in the order they will be needed. For example, when approaching an airport, the display 400 may present ATIS, approach, tower and ground radio devices in order, assuming a normal VFR landing.

Figure 5:
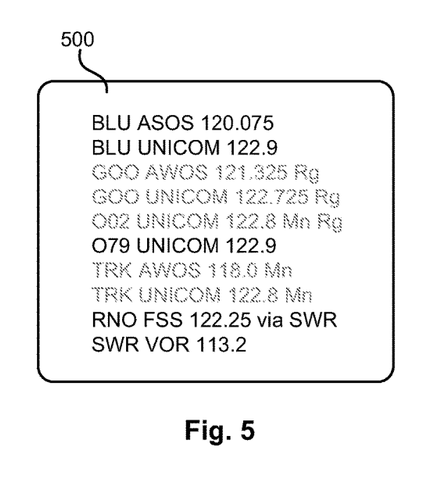
FIG. 5 illustrates another example of a display for presenting a list of radio devices to an occupant of a vehicle.

Referring to FIG. 5, in selected examples, a display 500 may differentiate between radio devices that are most likely within communication range, from radio devices that may be affected by an obstruction, are out of range, or are at or near the limit of the vehicle's communication range. For example, radio devices that may be obstructed by mountains or are out or near the limit of the vehicle's communication range may be displayed in a different color or with different highlighting, or be marked by an identifier such as a symbol, word, or abbreviation. This may allow a pilot to quickly differentiate between radio devices that are likely within range and those that may not be in range. Alternatively, the display 500 may differentiate between radio devices that may be technically within range (i.e., falling within a determined radius 110), and radio devices that are actually in range as detected by a scanner.

Figure 6:
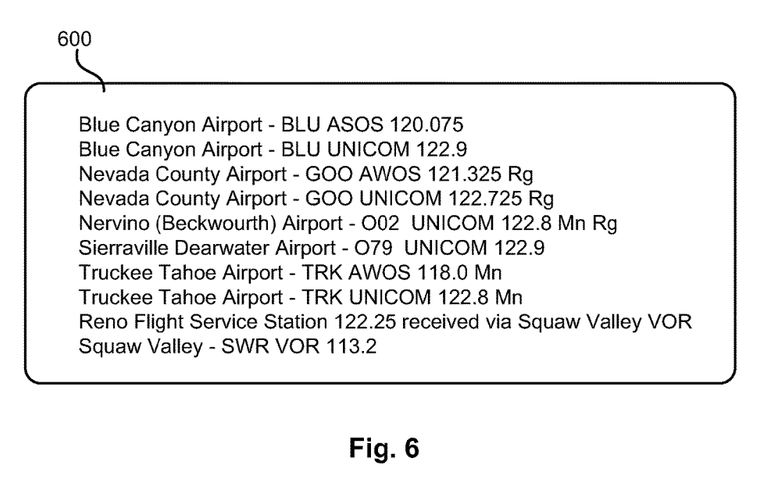
FIG. 6 illustrates yet another example of a display for presenting a list of radio devices to an occupant of a vehicle.

Referring to FIG. 6, as mentioned, a display 600 may, in certain examples, provide a more detailed or descriptive list of radio devices. For example, a full name of an airport or ground station may be displayed in addition to the radio device information illustrated in FIG. 4. This may reduce the need to look up or memorize the airport or ground station codes and may provide additional readability or be helpful to a novice pilot.

In selected examples, an audio device may work in conjunction with the display devices 400, 500, 600 of FIGS. 4 through 6 to present information to an operator of a vehicle 102. For example, an audible indicator stating "ground control selected" may be announced over a pilot's headset or an operator's audio system along with a visual indicator stating "ground control frequency selected" which may be highlighted on the display. Alternatively, a simple audible sound such as a beep or buzz may be utilized. If desired, audible presentations may accompany or be substituted for other visual presentations of information as described herein.

Figure 7:
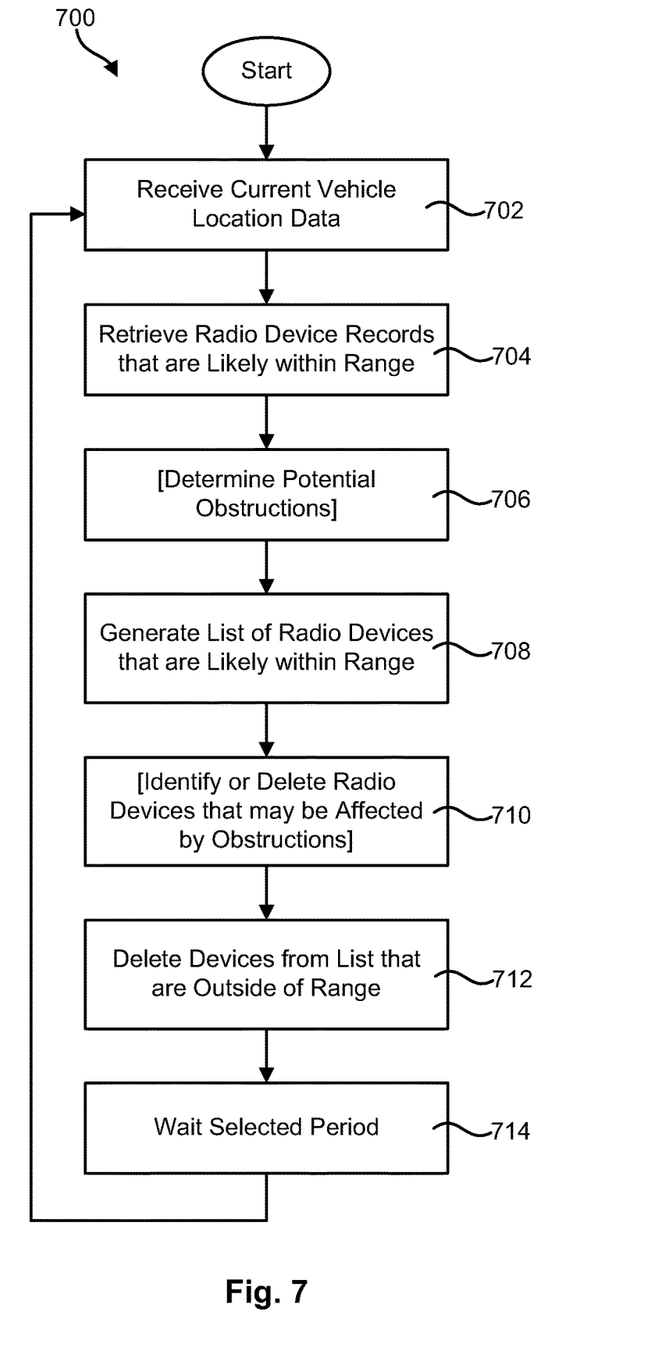
FIG. 7 illustrates one example of a method for generating and maintaining a radio device list in accordance with the invention.

Referring to FIG. 7, in selected examples, a method 700 in accordance with the invention may include initially receiving 702 a vehicle's current location. This location may be expressed in any suitable coordinate system and may include, for example, GPS coordinates. Radio device records corresponding to radio devices that are likely within the communication range of the vehicle 102 may then be retrieved 704 from a database 206. This step 704 may include returning records of radio devices that are located within a determined radius 110 of the vehicle 102. In certain examples, the communication range of the radio devices, as stored in the radio device records 306 or calculated from data stored in the radio device records 306, may also be considered. This will ensure that not only is a radio device within the vehicle's communication range but also that the vehicle 102 is within the radio device's communication range. Nevertheless, in selected examples, and for reasons of simplicity, it may be assumed that a vehicle 102 and a radio device will be able to communicate with one another if the radio device is within a selected radius 110 of the vehicle 102.

Once the radio device records 306 are retrieved from the database 206, the method 700 may optionally determine 706 if there are obstructions that may block or affect communication between the vehicle 102 and the radio devices. This may be performed by retrieving obstruction records 324 from the database 206. Once the radio device records are retrieved and the obstructions are determined, a list of radio devices that are likely to be within range of the vehicle 102 may be generated 708. This may include deleting 710 or identifying 710 radio devices in the list that may be affected by obstructions. This may also include deleting 712 radio devices from the list that were previously in range but are no longer in range. After waiting 714 a selected period, the process 700 may be repeated to ensure that the list remains current and up-to-date. The process 700 may also be repeated upon operator request or after the vehicle travels a selected distance.

Figure 8:
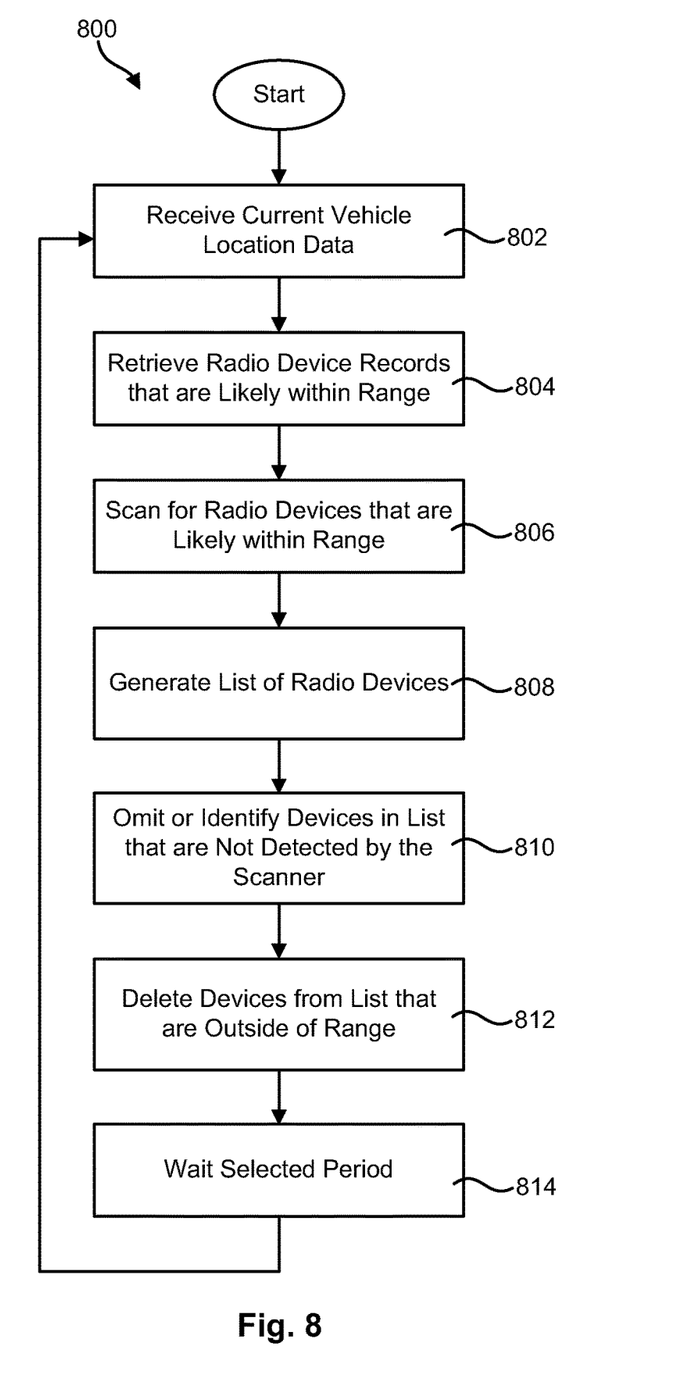
FIG. 8 illustrates another example of a method for generating and maintaining a radio device list in accordance with the invention.

Referring to FIG. 8, in another example, a method 800 in accordance with the invention may include initially receiving 802 a vehicle's current location and retrieving 804, from the database 206, radio device records associated with radio devices that are likely to be within the communication range of the vehicle 102. Once these radio device records have been retrieved 804, the communication frequencies of the radio devices may be scanned 806 to determine which radio devices are actually in range. The scanning step 806 may be performed in place of or in addition to the step 706 of accounting for obstructions, as described in FIG. 7. Once the scanning is performed, a list of radio devices that are likely to be within range of the vehicle 102 may be generated 808. This may include omitting 810 or identifying 810 radio devices in the list that were not detected during the scanning step 806. This may also include deleting 812 radio devices from the list that were previously in range but are no longer in range. After waiting 814 a selected period, the process 800 may be repeated to ensure that the list remains current and up-to-date. The process 800 may also be repeated upon operator request or after the vehicle travels a selected distance.

It should be understood that apparatus and methods in accordance with the invention may be practiced with other types of vehicles, such as automobiles, watercraft, trucks, or heavy machinery, or with portable radios not attached to a vehicle. For example, automotive radios may be coupled to a location device 202 and may include a database 206 of radio stations that the radio is configured to receive. The database 206 may store radio station records which may include a unique name or identifier, a type (e.g., AM, FM, TV, Satellite, NOAA weather, public service, etc.), a format (e.g., police, fire, animal control, country, rock, classic, talk, shopping, news, etc.), a communication frequency, transmitting power including variations in transmitting power as a function of time or day, and location. The database 206 may also store records associated with potential obstructions. The radio may then use the current position information and the database records to provide a list of radio stations that are likely within range of the automobile.

For example, the radio may present one set of radio stations when an automobile is on one side of a mountain range and present a second set of radio stations when the automobile is on an opposite side of the mountain range. Similarly, the first and second sets may be displayed when the automobile is at or near the top of the mountain range, since both sets of stations may be in range. As another example, as an automobile travels from one city to another, the radio may be configured to display stations from an originating city before reaching a midpoint between the two cities, and display stations from a destination city after passing the midpoint between the two cities.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

As explained above, embodiments of the system and method described herein provide a way to present a list of radio devices to an occupant of a vehicle. Various tasks or modules described herein may be implemented using a central processing unit (CPU), a graphics processing unit (GPU), a microprocessor, or the like. The microprocessor may be a specialized or dedicated microprocessor configured to perform tasks by executing machine-readable software code that defines the tasks. The microprocessor also may be configured to operate and communicate with other devices such as direct memory access modules, memory storage devices, internet-related hardware, and other devices configured to transmit data. Software code may be configured using software formats such as Java, C++, XML (Extensible Mark-up Language), or the like to define functions required to carry out the functional operations described herein. The code may be written in different forms and styles, the likes of which are known to those skilled in the art. Different code formats, code configurations, styles, and forms of software programs may be implemented.

Where a computer is used to implement the present invention, different types of memory devices may be used to store or retrieve information while performing some or all of the functions described herein. In some embodiments, the memory/storage device may be a separate device that is external to the processor, or may be incorporated into a monolithic device, where the memory or storage device is located on the same integrated circuit, such as components connected on a single substrate. Cache memory devices are often included in computers for use by a CPU or GPU as a convenient storage location for information that is frequently stored and retrieved.

Similarly, persistent memory may be used by a computer to store information that is frequently retrieved by a CPU, but is not often altered. Main memory may be used to store and retrieve larger amounts of information such as data and software applications configured to perform certain functions when executed by a CPU. These memory devices may be configured as random access memory (RAM), static random access memory (SRAM), dynamic random access memory (DRAM), flash memory, and other memory storage devices accessible by a CPU to store and retrieve information. Embodiments of the invention may be implemented using memory and storage devices, as well as any suitable protocol for storing and retrieving information in these memory devices.

Although the operations or steps of the methods 700, 800 are shown and described in a particular order, the order may be altered such that certain operations or steps are performed in an inverse order and such that selected steps or operations are performed, at least in part, concurrently with other steps or operations.

The invention claimed is:

1. A method comprising:
receiving location data identifying the current location of a vehicle;
querying a database storing a plurality of radio device records, each radio device record identifying a radio device, and a location of the radio device;
in response to at least distance of the vehicle current location relative to radio device locations in said database, retrieving, from the database, selected radio device records from the plurality of radio device records associated with radio devices likely to be within communication range of the vehicle;
determining, in response to the vehicle current location, obstructions with the potential to affect communication with radio devices;
in response to the potential obstructions, generating a radio device list from the selected radio device records; and
presenting the radio device list to an occupant of the vehicle.

2. The method of claim 1, the database further storing a plurality of obstruction records, each obstruction record identifying an obstruction with the potential to affect communication between the vehicle and a radio device.

3. The method of claim 2, further comprising retrieving, from the database, obstruction records associated with obstructions within the communication range of the vehicle.

4. The method of claim 3, wherein generating a radio device list comprises indicating, in the radio device list, radio devices that are affected by at least one of the obstructions.

5. The method of claim 3, wherein generating a radio device list comprises omitting, from the radio device list, radio devices affected by at least one of the obstructions.

6. The method of claim 1, wherein each radio device communicates bidirectionally over a communication frequency.

7. The method of claim 1, further comprising scanning the communication frequencies of radio devices associated with the selected radio device records.

8. The method of claim 7, wherein generating a radio device list comprises excluding, from the radio device list, radio devices that are not detected during scanning.

9. The method of claim 7, wherein generating a radio device list comprises indicating, in the radio device list, radio devices that are detected during scanning.

10. The method of claim 1, wherein the radio devices include at least one selected from the group consisting of receivers, transceivers, and transponders.

11. The method of claim 1, further comprising enabling the occupant to select, and thereby communicate with, a radio device in the radio device list and notify the operator if he or she attempts to select a radio device that is not in communications range.

12. The method of claim 11, further comprising notifying the occupant, through at least one of an audio and visual indicator, that the occupant is attempting to communicate with a radio device that is at least one of out of communication range with the vehicle, not detected during scanning, and affected by an obstruction.

13. A method as in claim 1 wherein said current location of said vehicle includes at least one of said vehicle's elevation or altitude.

14. A method as in claim 1 wherein said radio device list includes information that one or more radio device may be affected by an obstruction.

15. An apparatus comprising:
a location device to identify the current location of a vehicle;
a database storing a plurality of radio device records, each radio device record identifying a radio device and a location of the radio device;
one or more processors to receive the current location from the location device and in response to at least distance of the vehicle current location relative to radio device locations in said database, retrieve, from the database, selected radio device records from the plurality of radio device records associated with radio devices likely to be within communication range of the vehicle, wherein the one or more processors further:
determine in response to the vehicle current location obstructions with the potential to affect communication with radio devices, and
generate, in response to the potential obstructions, a radio device list from the selected radio device records; and
a presentation device to present the radio device list to an occupant of the vehicle.

16. The apparatus of claim 15, the database further storing a plurality of obstruction records, each obstruction record identifying an obstruction with the potential to affect communication between the vehicle and a radio device.

17. The apparatus of claim 16, the one or more processors further configured to retrieve, from the database, obstruction records associated with obstructions within the communication range of the vehicle.

18. The apparatus of claim 17, wherein the one or more processors is further configured to indicate, in the radio device list, radio devices that are affected by at least one of the obstructions.

19. The apparatus of claim 17, wherein the one or more processors is further configured to omit, from the radio device list, radio devices that are affected by at least one of the obstructions.

20. The apparatus of claim 15, wherein each radio device communicates bidirectionally over a communication frequency.

21. The apparatus of claim 20, further comprising a scanner to scan the communication frequencies of radio devices associated with the selected radio device records.

22. The apparatus of claim 21, wherein the one or more processors is further configured to exclude, from the radio device list, radio devices that are not detected by the scanner.

23. The apparatus of claim 21, wherein the one or more processors is further configured to indicate, in the radio device list, radio devices that are detected by the scanner and notify the operator if he or she attempts to select a radio device that is not in communications range.

24. The apparatus of claim 15, wherein the radio devices include at least one of selected from the group consisting of receivers, transceivers and transponders.

25. The apparatus of claim 15, wherein the presentation device comprises a user interface to enable an occupant to select, and thereby communicate with, a radio device in the radio device list and notify the operator if he or she attempts to select a radio device that is not in communications range.

26. The apparatus of claim 25, further comprising a notification module to notify the occupant, through at least one of an audio and visual indicator, that the occupant is attempting to communicate with a radio device that is at least one of out of communication range with the vehicle, not detected during scanning, and affected by an obstruction.

27. An apparatus as in claim 15 wherein said location device identifies the current location of said vehicle including at least one of said vehicle's elevation or altitude.

28. An apparatus as in claim 15 wherein said radio device list includes information that one or more radio device may be affected by an obstruction.

29. An apparatus comprising:
a location device to identify the current location of a vehicle;
a database storing a plurality of radio device records, each radio device record identifying a radio device, a location of the radio device, and a communication frequency associated with the radio device;
a one or more processors to receive the current location from the location device and in response to at least distance of the vehicle current location relative to radio device locations in said database, retrieve, from the database, selected radio device records from the plurality of radio device records associated with radio devices likely to be within communication range of the vehicle;
a scanner to scan the communication frequencies of radio devices associated with the selected records;
wherein the one or more processors further:
 determine, in response to the vehicle current location, obstructions with the potential to affect communication with radio devices, and
 generate, in response to the potential obstructions a radio device list from the selected radio device records that are detected by the scanner; and
a presentation device to present the radio device list to an occupant of the vehicle.

30. An apparatus as in claim 29 wherein said location device identifies the current location of said vehicle including at least one of said vehicle's elevation or altitude.

31. An apparatus as in claim 29 wherein said radio device list includes information that one or more radio device may be affected by an obstruction.

32. A method comprising:
receiving location data identifying the current location of a vehicle;
querying a database storing a plurality of radio device records, each radio device record identifying a radio device, a location of the radio device, and a communication frequency associated with the radio device;
in response to at least distance of the vehicle current location relative to radio device locations in said database, retrieving, from the database, selected radio device records from the plurality of radio device records associated with radio devices likely to be within communication range of the vehicle;
scanning the communication frequencies of radio devices associated with the selected radio device records;
determining, in response to the vehicle current location, obstructions with the potential to affect communication with radio devices;
in response to the potential obstructions, generating a radio device list from the selected radio device records detected during scanning; and
presenting the radio device list to an occupant of the vehicle.

33. A method as in claim 32 wherein said current location of said vehicle includes at least one of said vehicle's elevation or altitude.

34. A method as in claim 32 wherein said radio device list includes information that one or more radio device may be affected by an obstruction.

* * * * *